(12) United States Patent
Breivik

(10) Patent No.: US 6,480,470 B1
(45) Date of Patent: Nov. 12, 2002

(54) METHOD FOR SUPPORTING TRAFFIC ANALYSIS IN AN ATM (ASYNCHRONOUS TRANSFER MODE) NETWORK

(75) Inventor: Øyvind Breivik, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/208,772

(22) Filed: Dec. 10, 1998

Related U.S. Application Data

(63) Continuation of application No. PCT/NO97/00133, filed on May 27, 1997.

(30) Foreign Application Priority Data

Jun. 12, 1996 (NO) ................................. 962478
May 27, 1997 (NO) ............................... PCT/NO97/00133

(51) Int. Cl.[7] ............................................. H04L 25/56
(52) U.S. Cl. ................................. 370/252; 370/395.21
(58) Field of Search ................................ 370/389, 395, 370/397–399, 401, 402, 403, 468, 465, 466, 474, 351, 352, 412, 413–419, 428, 443, 444, 450, 232, 233, 234

(56) References Cited

U.S. PATENT DOCUMENTS

| | | | |
|---|---|---|---|
| 5,317,563 A | 5/1994 | Oouchi et al. | |
| 5,335,222 A | 8/1994 | Kamoi et al. | |
| 5,361,253 A | 11/1994 | Feijen et al. | |
| 5,414,701 A | 5/1995 | Shtayer et al. | |
| 5,555,244 A | * 9/1996 | Gupta et al. | 370/462 |
| 5,602,830 A | * 2/1997 | Fichou et al. | 370/232 |

FOREIGN PATENT DOCUMENTS

| | | |
|---|---|---|
| EP | 0 472 154 A2 | 2/1992 |
| EP | 0 596 159 A1 | 5/1994 |
| EP | 0 600 683 A2 | 6/1994 |
| EP | 0 671 827 A2 | 11/1994 |
| EP | 0 674 458 A1 | 2/1995 |
| SE | 503 317 C2 | 5/1996 |
| WO | 97/16034 | 5/1997 |

\* cited by examiner

*Primary Examiner*—Dang Ton
(74) *Attorney, Agent, or Firm*—Nixon & Vanderhye P.C.

(57) ABSTRACT

The present invention relates to a method for supporting traffic analysis, especially in an ATM (Asynchronous Transfer Mode) network, in which a transmission procedure is based on asynchronous time division multiplexing using fixed-length data packets or cells, and for the purpose of providing a method which allows for handling on-line traffic analysis procedures in a more flexible manner, allowing fast updating, and rendering only one explicit notion of time, and without any risk of inaccuracies. Used in combination are a data accumulator (DA) and a chronometer scheduler (CHR), said data accumulator (DA) including a channel data table (CDT) which is continuously updated by the traffic data ($CA_m$) to be analyzed, and said chronometer scheduler (CHR) including a scheduler table (CST) which is continuously and sequentially ($SW_1$–$SW_n$) selecting the next traffic analysis job ($CA_n$) to be executed. Scheduling of traffic analysis of a certain channel is effected when an updated channel address ($CA_x$) of the channel data table corresponds with a valid channel address in said scheduler table.

24 Claims, 4 Drawing Sheets

METHOD FOR SUPPORTING TRAFFIC ANALYSIS IN AN ATM (ASYNCHRONOUS TRANSFER MODE) NETWORK

This is a continuation of PCT application Ser. No. PCT/NO97/00133, filed May 27, 1997.

FIELD OF THE INVENTION

The present invention relates to a method for supporting traffic analysis, especially in an ATM (Asynchronous Transfer Mode) network, in which a transmission procedure is based on asynchronous time division multiplexing using fixed-length data packets or cells.

Technical Field

Software to support traffic analysis in an Asynchronous Transfer Mode (ATM) network has been disclosed in ref. [1] and ref. [6].

ATM is a transmission procedure based on asynchronous time division multiplexing using fixed-length data packets called cells. A cell contains a header field for control information and a payload field for user data information. The header includes, among other things, an address field that identifies a transmission channel. An ATM network comprises a set of nodes, each node being connected to one or more nodes within the network, which route the cells to their various destinations.

TECHNICAL BACKGROUND

The Problem Area

ATM networks may carry calls of a bursty traffical nature. Traffical analysis (ref. [2]) within an ATM network and during network operation may be used as an instrument to investigate the characteristics of the connections carried on the network and the characteristics of the network as a whole.

In general, such an on-line traffic analysis procedure will require:

1. A computational environment that permits the execution of traffic analysis logic.
2. One or more code blocks that serve as the logic of the traffic analysis to be performed.
3. A sheduler method that selects the next traffic analysis job to be executed.
4. A data collection method that gathers and stores the traffical data to be analysed.
5. A dispatcher method that gives an execution control to the traffic analysis job selected by the scheduler method.

The present invention relates to 3 and 4.

The difficulty with scheduling on-line traffic analysis jobs and traffical data collection in an ATM network is the transmission speed involved together with the great number of connections that may be carried simultaneously by the network.

Due to the transmission speed involved, for a traffic analysis method to be effective it must operate on, and be selected for execution at, very small time intervals. Otherwise, it will not be able to capture the traffical characteristics. The more fine the time interval granularity is, the more important the accuracy of the time intervals becomes: If imprecision is introduced in the scheduler method and the analysis is repeatedly applied to consecutive time intervals, the inaccuracy is aggregated and the analysis becomes unreliable.

Clearly, in order to perform any traffic analysis traffical data must be collected prior to the execution of the analysis job. Such a data collection method is strongly interlinked with the scheduler since, when a traffic analysis job is selected for execution, the traffical data pertaining to the particular analysis job must be handed over to that job. Since an ATM network may carry numerous connections simultaneously, the traffic analysis jobs may in total require a vast amount of traffical data. It is therefore very important that the data collection method operates efficiently in terms of storage together with the scheduler method.

The problems presented above call for a new method with minimal complexity that can handle the scheduling of numerous concurrent traffic analysis jobs on small time intervals and with high accuracy yet is efficient in terms of capacity and storage requirements.

Known Solutions and Problems with These

Two existing methods to support such on-line traffical analysis are:

Individual counting of cells pertaining to separate connections over the whole duration of each connection per link. Analysis may be scheduled per connection after disconnection has taken place.

Continuously counting of the aggregated number of cells, for all connections, on a link. Analysis may be scheduled at every cell interval, on a link basis.

The former may for instance be used to analyse the traffic of connections in terms of cells sent during connection time or in terms of the mean cell rate. The latter may be used to continuously analyse the ratio: link capacity to actual load.

The advantage of the known solutions is simplicity. However, they do not allow rigorous traffic analysis to be made. The problems with the known solutions are:

The granularity of the time interval over which the traffical analysis may be sheduled. Enabling analysis after disconnection or per cell interval are two extremes. What is required is a method that can schedule analysis jobs in a more flexible manner with respect to the time interval.

The granularity of the connection aggregation over which the analysis is performed. Allowing analysis to be scheduled on a link basis or per connection basis are two extremes. What is required is a flexible method that allows analysis to be performed on any level of traffical data aggregation.

Further Prior Art

U.S. Pat. No. 5,414,701 (Shtayer et al.) relates to a method and data structure for performing address compression in an ATM system. The system comprises a data accumulator means comprising virtual channel tables which are updated by traffic data. In the data traffic to an ATM link cells are retrieved by a cell extractor for thereafter by a cell-to-channel look-up means to be located in a virtual channel accumulator means.

SE 503 317 (Petersen/LM Ericsson) relates to a method for connecting STM cells in a circuit simulated ATM selector. The ATM selector comprises a unit which assigns a predetermined number of time slots to a cell. FIG. 3 illustrates an STM cell at various reference points of time in the ATM selector, and the use of an associated time schedule means (chronometer) is also suggested.

Further publications related to this field of the art are: U.S. Pat. Nos. 5,317,563, 5,335,222, 5,361,253, EP 671,827 and EP 674,458.

BRIEF DISCLOSURE OF THE INVENTION

The main object of the present invention is to provide an improvement in a method as stated in the preamble, and according to the invention this object is achieved by using in combination a data accumulator means and a chronometer scheduling means, said data accumulator means comprising a channel data table which is continuously updated by the traffic data to be analyzed, and said chronometer scheduling means comprising a scheduler table which is continuously and sequentially selecting the next traffic analysis job to be executed, a scheduling of traffic analysis of a certain channel being effected when an updated channel address of said channel data table corresponds with a valid channel address in said scheduler table.

In other words, the invention presents a solution that is based on combined chronometer scheduler mechanism and data collection mechanism, both of which collaborate by means of a traffical data table and a scheduler table. The invention allows the scheduling of traffic analysis jobs and the interlinked collection of traffical data to be handled in a flexible and efficient manner.

Further objects and advantages related to the present invention will appear from the following description taken in conjuction with the enclosed drawings, as well as from the appended patent claims.

BRIEF DISCLOSURE OF THE DRAWINGS

DETAILED DESCRIPTION OF THE EMBODIMENTS

Figure 1:
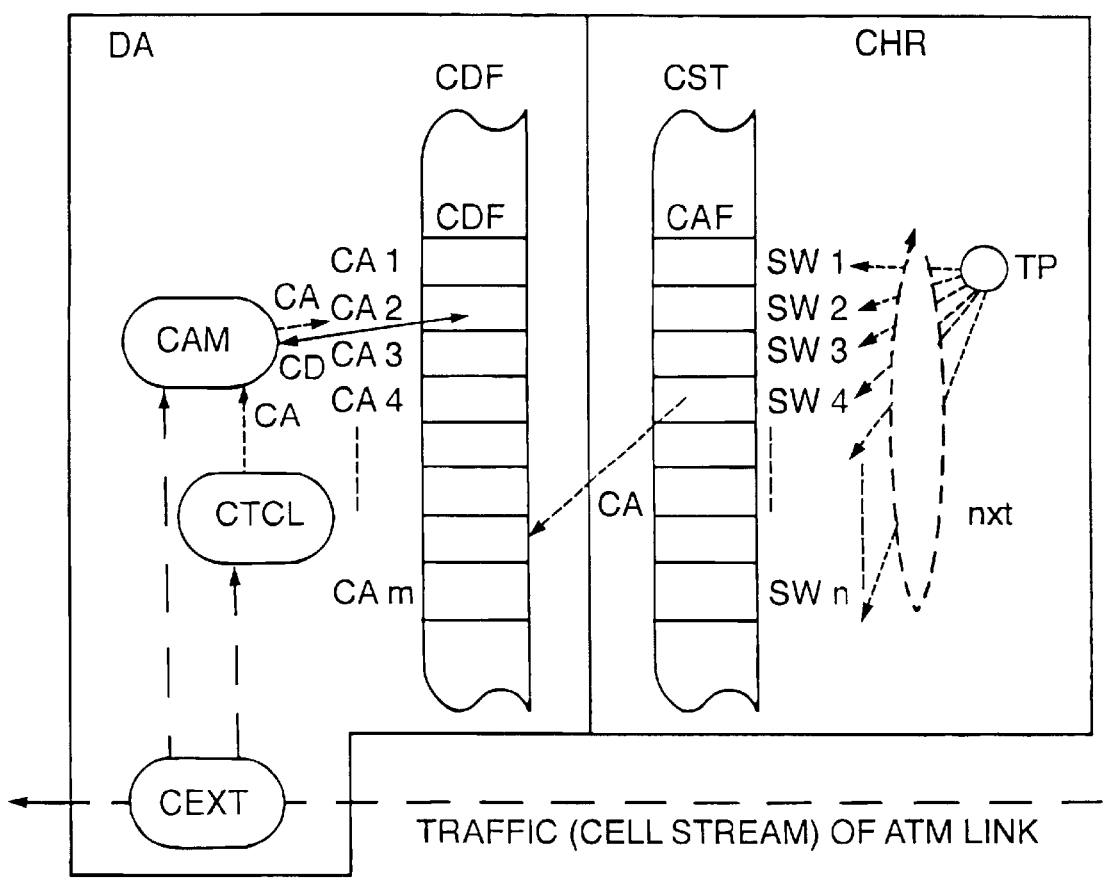
FIG. 1 illustrates the components included in a embodiment of the present invention.

It is to be understood that the following description is based on an example only of the present invention, and then especially in connection with ATM networks. However, it is to be understood that the present invention can be realized in various other ways, without departing from the scope and the spirit of the present invention.
The Components The main components of an embodiment of the invention are depicted in FIG. 1 and they are further specified in the subsequent sections of the following description.
The Data Accumulator (DA)

Any ATM traffic analysis method will require an underlying method that collects and stores the data that are to be analysed. This is the function of the DA of the invention.

Cells are extracted from the incoming traffic (cell stream) of an ATM link at the Cell Extractor (CEXT) and thereafter passed on to the Cell-to-Channel Look up Method (CTCL) and to the Channel Accumulator Method (CAM).

The CTCL finds the Channel Address (CA) for a cell and passes this on to the CAM. The term channel is used to denote a cell address-to-traffic aggregation association (e.g., a specific virtual path connection carried on the link, a specific virtual circuit connection carried on the link, a special set of virtual channel identifiers, and so on). The CA uniquely identifies a channel within the Channel Data Table (CDT). The CTCL may for instance be realised by means of a direct look up procedure into the CDT based upon the cell header address or it may be realised by use of an address look up table that translates cell header addresses into CAs.

The CAM updates the Channel Data Field (CDF) of the CDT row identified by the CA with information based on the cell received from the CEXT. Note that this cell is the same as the one used within the CTCL to find the associated CA, i.e. CAM and CTCL are synchronized. The Channel Data (CD) denotes the data of interest for any channel that is to be analysed (e.g., the number of cells received on the channel, the number of user cells received on the channel, the number of operation and maintenance cells received on the channel, the number of cells with the cell loss priority bit set at '1', the number of discarded cells from a usage parameter control mechanism, and so on). The CAM may make use of the CD already present (from previous updates) in its calculation of the new CD that it inserts into the CDF of the CDT identified by the CA.
The Chronometer (CHR)

The CHR mechanism allows scheduling of traffic analysis jobs to take place for every channel at fixed and small time intervals.

Conceptually, the chronometer mechanism may be seen as a watch that has a time indicator or pointer (TP) that ticks along with a given time unit frequency (1/t), and that has a certain number of time units around its circumference (n).

The frequency together with the number of time units, comprising a round trip, determine the time interval over which scheduling of analysis jobs take place.

At every tick, scheduling may take place, in effect realising a set of parallel conceptual stop watches started at different points in time. This is illustrated, by means of an example configuration, in FIG. 2 and in FIG. 3.

Figure 2:
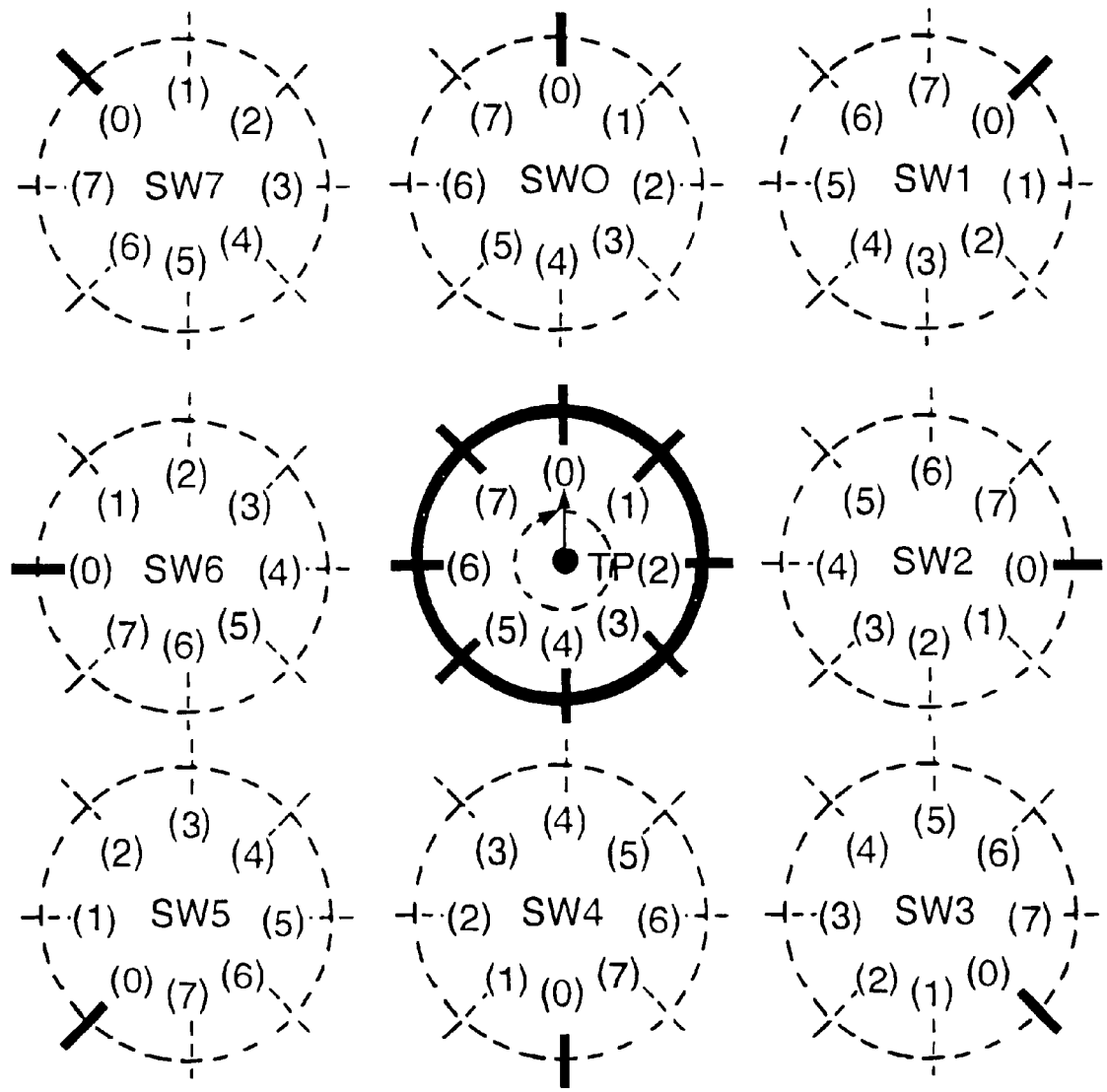
FIG. 2 is an illustration of the chronometer mechanism (conceptually).

What is depicted in FIG. 2 is the following:

The circle in bold illustrates a global chronometer (with 8 time units in this example). The time indicator (TP), which is shown by the arrow, progresses with a given frequency (1/t).

The dotted circles illustrate the parallel stop watches (SW0 . . . SW7). The bold line of each stop watch shows the relationship between the global chronometer and the start of each stop watch.

The numbers enclosed in parenthesis show the time interval units relative to the start of the global chronometer.

Figure 3:
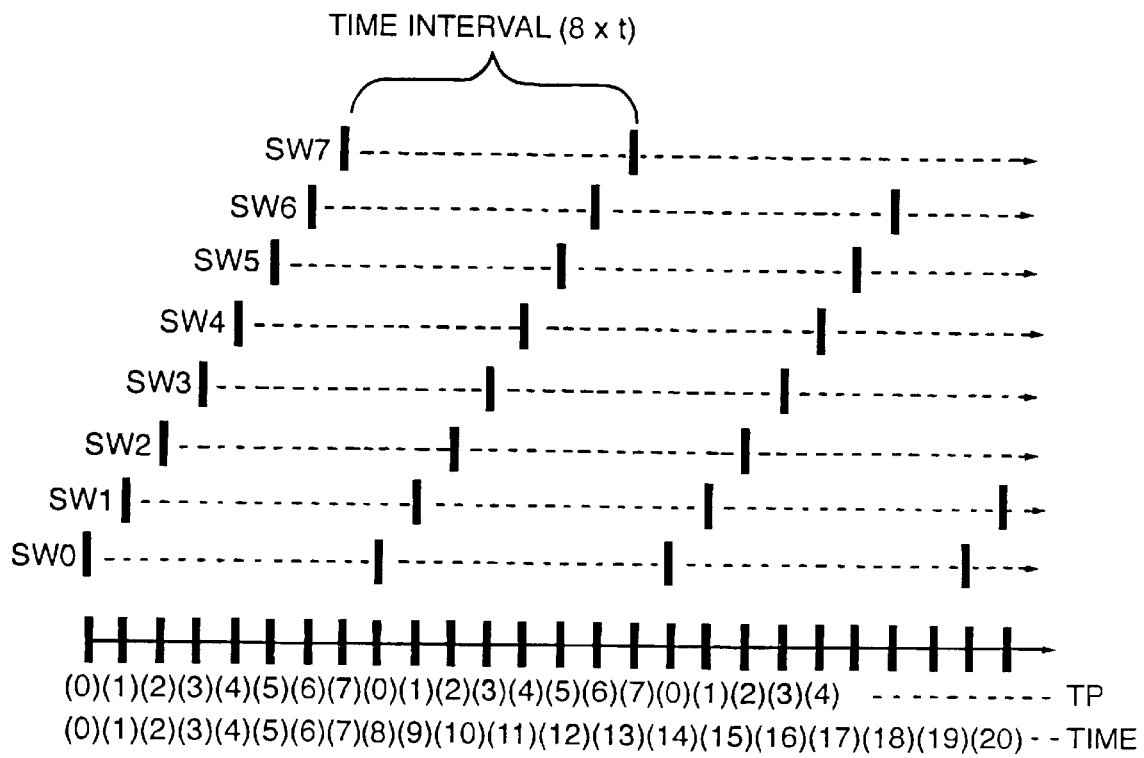
FIG. 3 depicts the chronometer mechanism illustrated with a time axis.

In FIG. 3 the following is illustrated:

The horizontal axis shows the values of the time pointer (TP) as time progresses with units of t.

The dotted arrows show the parallel stop watches (SW0 . . . SW7) of a chronometer with 8 time units (in this example).

The vertical bold lines on each stop watch indicate when scheduling of traffic analysis jobs take place with respect to the global time indicator (TP).

The TP thus maintains a global notion of time and there is a one-to-one relation between a specific TP value and a specific SW.

When a channel, identified by the CA, is to be set for traffic analysis scheduling the current TP value is first inspected and the SW relation is found. The SW relation uniquely identifies a row of the Channel Scheduler Table (CST). The Channel Address Field (CAF) of the CST row, identified by the SW, is then set to the CA value of the channel that is to be set for traffic analysis scheduling. This completes the establishment of a new traffic analysis scheduling job. Thereafter, the TP progresses in normal fashion and, after the time interval, the TP will again contain the same value as when the channel was first set for traffic analysis scheduling. At this point the traffic analysis job of the channel is scheduled. The process is repeated and scheduling occurs after each consecutive time interval. At every step (t) of the TP advance the SW relation is found and the associated CAF is inspected. If there is a valid CA within the CAF, the associated channel, identified by the CA, is scheduled for traffic analysis.

Figure 4:
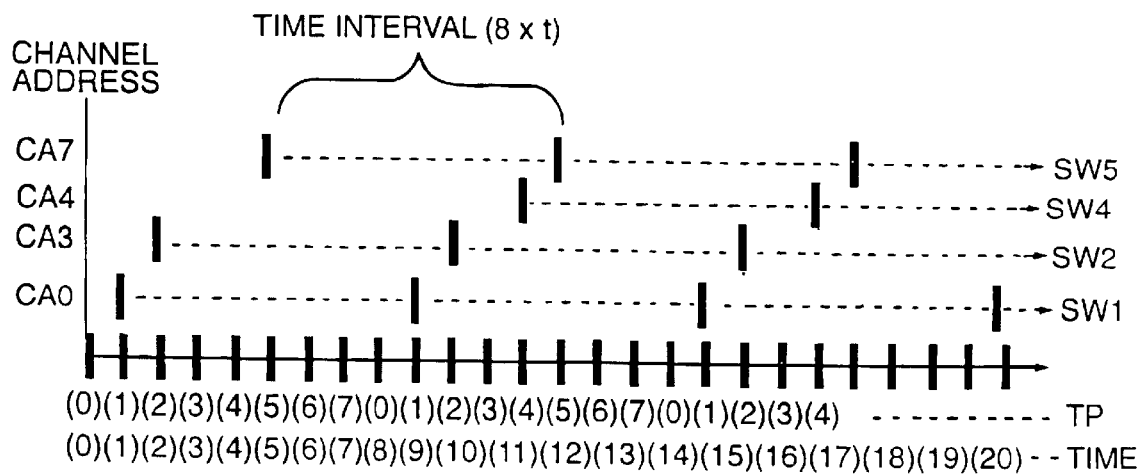
FIG. 4 illustrates an example of the scheduling mechanism.

Reference is made to FIG. 4 in which is illustrated an example of the scheduling mechanism:

The example illustrated makes use of a chronometer with 8 time units.

Four channels are illustrated, with channel address 0, 3, 4 and 7, respectively.

The horizontal axis shows the value of TP as time progresses in steps of t.

The vertical axis shows the channel address (CA) to stop the watch (SW) relations.

A tuple (TP, CA) identifies the point in time when scheduling of a traffic analysis job of a channel takes place.

CA0 is set for scheduling at TP=1; and is scheduled at time 9, 17, etc.

CA3 is set for scheduling at TP=2; and is scheduled at time 10, 18, etc.

CA4 is set for scheduling at TP=4; and is scheduled at time 20, 28, etc.

CA7 is set for scheduling at TP=5; and is scheduled at time 13, 21, etc.

The CAF allows a channel to be set for traffic analysis scheduling at any point in time. A special case, however, is if the CAF (identified by the current TP-to-SW relation) is already occupied by another channel. This is solved by halting the CA insertion until the TP shows a CDF that is available. If the number of stop watches (n) is greater than or equal to the number of possible channels (m) then the start of the time interval must at most wait for a period of (m×t).

In the time interval that has passed (prior to the next scheduling for a channel) the DA may have updated the CDF of the CA, see FIG. 1. The traffic analysis job may make use of the data collected by the DA (for the channel in question) within the previous time interval; and it may reset the CDF of the CA to prepare for the data accumulation of the next time interval.

The scheduler mechanism selects the next traffic analysis job to be started. The actual triggering or dispatching of the execution of a selected traffic analysis job may be realised as follows: An extra field may be included in the CDT. For each row the entry of this field may point to a code block that represents the analysis job to be performed for the specific channel. After the scheduler has selected a specific CA the computational environment could pass execution control to the specific code block pointed to within the field.

The Tables

The CST rows identify the SWs and contains the coupling between SWs and CAs. The TP of the CHR progresses down the CST with a given frequency (1/t), and wraps around to the first entry of the table (after having pointed to the last entry, SWn). The scheduling mechanism operates on the CAF column by fetching the CA of the current TP value; and thereafter schedules a traffic analysis job for the channel. The channel traffic analysis job may use the CD contained within the CDF of the CA of the CDT. The number of SWs (n) and the frequency of the TP advance (1/t) are configured a priori to give the desired time interval (n×t).

The CDT rows identify the CAs and contain the CDs of the CAs.

The present invention employs two separate tables. The two fields, CDT and CAF, may be combined into one table containing two such columns.

Restrictions

There are three restrictions to the invention:

The time interval is the same for all channels that are to be scheduled for traffical analysis. This can be overcome by the introduction of multiple TPs.

The number of time units must be greater or equal to the number of channels that may be scheduled for analysis.

The frequency of the TP advance must be at least the cell interarrival speed (as determined by the ATM transmission intervals).

Advantages

The advantages of the invention are:

Flexibility. It allows on-line traffical analysis procedures to be handled in a flexible manner regarding the granularity of traffic aggregation. That is, traffical analysis may be performed on a link as a whole, on any desired group arrangements of connections within a link, or on individual connections on a link. The granularity of the time interval can be configured to any desired interval.

Speed. A minimal amount of scheduling processing is required: there is only one explicit notion of time that needs to be maintained during operation and individual connection identifiers are coupled with the scheduling mechanism allowing fast updating.

Storage. There is only one explicit notion of time.

Accuracy. Time interval measurement interval is exact and the synchronization method permits analysis to commence and stop at any time without any risk of inaccuracies.

Generality. Any desired traffic analysis function will interoperate with the scheduling mechanism.

The speed and storage advantages of the invention permits the method to be employed in commercial ATM products situated in an ATM network (such as ATM switches, ATM Exchange Terminals, ATM Policing Boards, ATM Charging Servers, etc.) without calling for immense processing and storage requirements.

The qualitative advantages, namely flexibility, accuracy, and generality, promise a great potential for use of the invention in commercial ATM traffic analysis equipment.

Broadening

The following sections demonstrate the applicability of the invention.

A Method to Support Charging in ATM Networks

The invention can be used to support a usage-based charging scheme in an ATM network.

Charging of a connection in an ATM network may be a function of the traffical load that the connection places upon the network. The traffical load indicates the usage of the network by a customer. Analysis of the traffical characteristics of individual connections may be used to yield an expression of the network usage by a customer (ref. [4] and [5]).

An example of the use of the invention, in this context, is given below.

Figure 5:
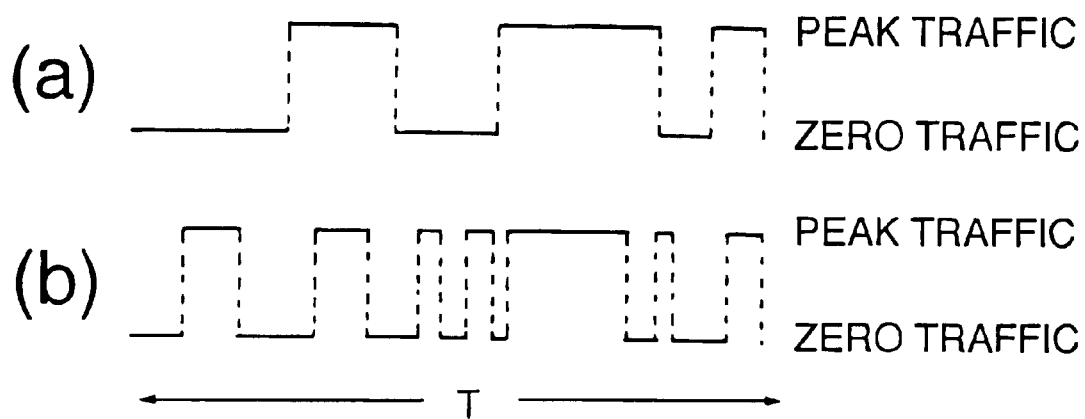
FIG. 5 illustrates two connections with different traffical characteristics (but same amount of cells) over connection time T.

Reference is made to FIG. 5, illustrating two connections with different traffical characteristics (but same amount of cells) over connection time T. In the Figure, (a) and (b) show two different traffical characteristics over a connection time interval T.

Both (a) and (b) are variable, traffic occuring at the peak rate or no traffic at all. Both have bursty characterisics. (a)

is more demanding on the network than (b) since (b) is more variable and therefore allows more statistical multiplexing to take place within the network. In a usage-based charging scheme (a) would pay more for the connection than (b).

Note, however, that even though they show different characteristics, the total number of cells sent over the connection time intervall T is the same. Therefore a simple solution that counts the number of cells over the connection interval and schedules an analysis at the end of the connections will not suffice, see previous chapter.

What is needed is a scheduling mechanism that enables analysis to take place at smaller intervals that T. The invention can be used for this purpose.

Figure 6:
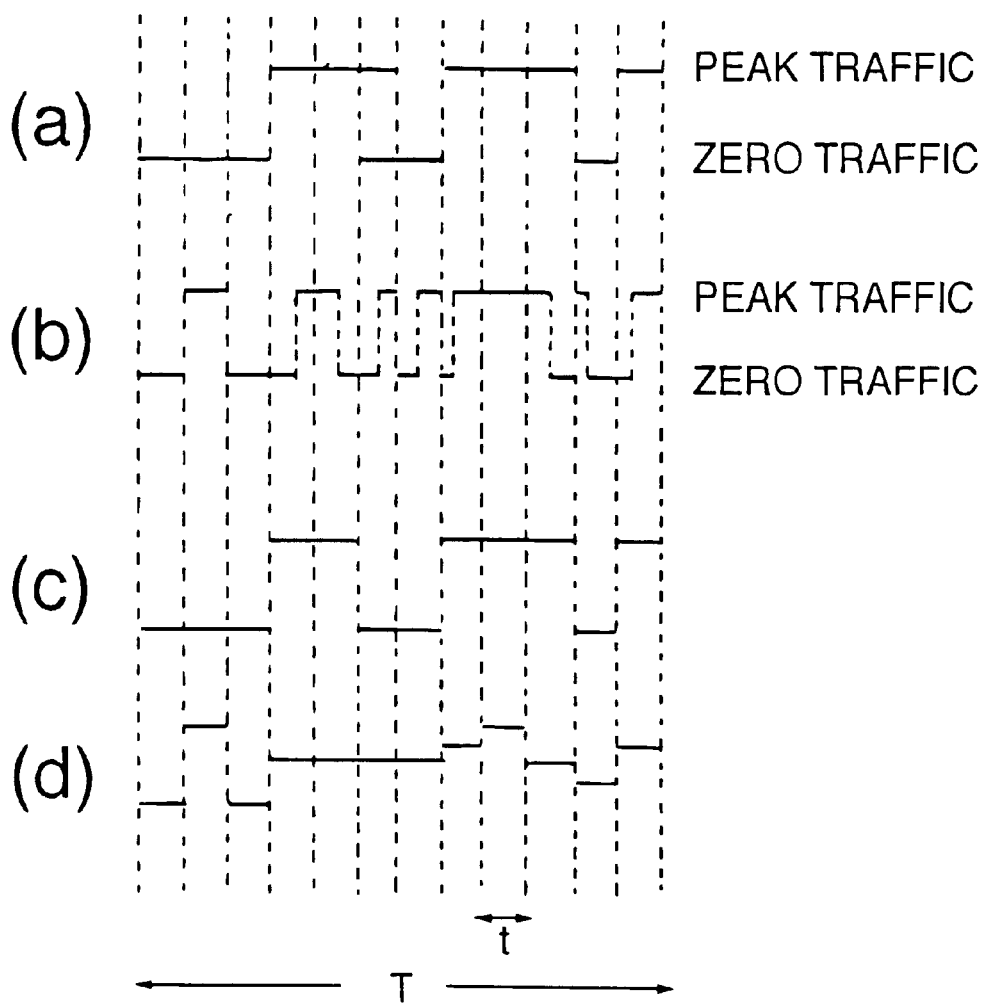
FIG. 6 illustrates scheduling analysis at intervals with a time interval 't' to capture charge in terms of burstiness.

Reference is now made to FIG. 6, illustrating shceduling analysis at intervals with a time interval 't' to capture charge in terms of burstiness.

The invention can be used to schedule analysis jobs at small time intervals (indicated by the dotted lines). One such analysis method might set a threshold between the peak and the zero to capture the burstiness of the connections over the small time intervals, as shown in (c) and (d) and (b), respectively.

A Method Used in Conjunction with Connection Admission Control (CAC)

The method described can be used in conjunction with a CAC mechanism.

Scheduling of traffic analysis may be used in a Connection Admission Control procedure to improve the efficiency of the network by taking account of the dynamic nature of the network load (ref. [6]).

Re: European Patent Application GB 9519901.4 (ref.[3])

The method described can be used for European patent application GB 9519901.4 (ref.[3]).

[3] relates to a communication network control method. In particular it relates to a tariff-based connection acceptance control.

[3] relies on measured loads of the connections currently carried on a transmission path. The measured loads sought for are the number of cells carried, on each connection respectively, over a short time interval.

The present invention can be used to support the measurements described in [3].

A Method Used to Support Resource Management Schemes

The method described can be used to support resource management schemes in an ATM network.

Traffical analysis can be used to estimate the instantaneous traffical load placed upon the network. The resulting estimate may indicate the resource availability of the network and hence be used in a network resource management scheme.

A Method Used to Support the Generation of User Profiles

The method described can be used as a tool for generating user profiles by traffic analysis. User profiles are important for network operators in for instance network planning and user evaluation.

A Method for Deterministic Scheduling

The method described can be used to schedule other tasks (i.e. not necessarily traffic analysis tasks) to be performed at a deterministic rate.

REFERENCES

[1] Kyas, O.: "ATM Networks". International Thomson Publishing, 1995.
[2] Hui, J. Y.: "Switching and Traffic Theory for Integrated Broadband Networks", Kluwer Academic Publishers, 1990.
[3] Kelly, F.: "A Communication Network Control Method", European Patent application No. GB 9519901.4.
[4] Kelly, F.: "Tariffs and Effective Bandwidths in Multiservice Networks", Proceedings of the 14th International Teletraffic Congress—ITC94, 1994.
[5] Courcoubetis, C.: "Charging Issues for Services in Broadband Networks", paper presented at the OECD Conference on the Economics of the Information Society, Istanbul, Turkey, December 1995.
[6] Onvural, R.: "Asynchronous Transfer Mode Networks: Performance Issues", Artech House Inc., 1994.

What is claimed is:

1. Method for supporting traffic analysis in an ATM (Asynchronous Transfer Mode) network, in which a transmission procedure is based on asynchronous time division multiplexing using fixed-length data packets or cells, the method comprising:

using in combination a data accumulator means and a chronometer scheduling means for scheduling traffic channels to be analyzed, said data accumulator means comprising a channel data table which is continuously updated by traffic data relating to ATM channel addresses to be analyzed, said chronometer scheduling means comprising a scheduler table which is continuously and sequentially selecting a next traffic analysis job to be executed, and wherein scheduling of traffic analysis of a certain ATM traffic channel is effected when an updated ATM channel address of said channel data table of said data accumulator means corresponds with a valid ATM channel address in said scheduler table of said chronometer scheduling means.

2. A method for supporting traffic analysis in an ATM (Asynchronous Transfer Mode) network, in which a transmission procedure is based on asynchronous time division multiplexing using fixed-length data packets or cells, the method comprising:

using in combination a data accumulator means and a chronometer scheduling means for scheduling traffic channels to be analyzed, said data accumulator means comprising a channel data table which is continuously updated by traffic data to be analyzed, said chronometer scheduling means comprising a scheduler table which is continuously and sequentially selecting a next traffic analysis job to be executed, wherein scheduling of traffic analysis of a certain channel is effected when an updated channel address of said channel data table of said data accumulator means corresponds with a valid channel address in said scheduler table of said chronometer scheduling means;

in connection with said data accumulator means, using a cell extractor means for extracting ATM cells from an incoming traffic cell stream of an ATM link and passing extracted cells on to a cell-to-channel look-up means and to a channel accumulator means, using said cell-to-channel look-up means to find the channel address for a cell and to pass this on to said channel accumulator means, using said channel accumulator means to update a channel data field of a channel data table row identified by said channel address, using said chronometer scheduling means to allow scheduling of traffic analysis jobs for every channel at fixed and small time units by using a time indicator or time pointer, setting a first channel for traffic analysis scheduling by inspecting a current time pointer value to find an associated time interval relation to uniquely identify a row of said channel scheduler table, setting a channel address field of said row of said channel scheduler table to the channel address of said first channel to be set for traffic analysis scheduling, letting said time pointer progress at said fixed and small time intervals for finding a second relation between a second time interval relation and the associated channel address field of said channel scheduler table for setting a second channel for traffic analysis scheduling, and letting scheduling repeatedly occur after each consecutive full time interval.

3. Method as claimed in claim 1, wherein the cell-to-channel look-up means performs a direct look-up procedure into said channel data table based upon a cell header address.

4. Method as claimed in claim 1, wherein said cell-to-channel look-up means comprises an address loop-up table that translates cell header addresses into channel addresses.

5. Method as claimed in claim 2, wherein said channel accumulator means is used to update the channel data field of said channel data table row identified by said channel address, with information based on the cell received from said cell extractor means, which cell is the same as the one used in said cell-to-channel look-up means to find the associated channel address, so that said channel accumulator means and said cell-to-channel look-up means are synchronised.

6. Method as claimed in claim 1, characterized in that said channel accumulator means makes use of channel data already present in its calculation of new channel data which is inserted into a channel data field of a channel data table row identified by said channel address.

7. Method as claimed in claim 2, wherein said chronometer scheduling means advances its time indicator or pointer at a given time unit (t) frequency (1/t) over a certain number of time units before said number of time units are repeated.

8. Method as claimed in claim 1, wherein said chronometer scheduling means initiates scheduling at a time unit by starting a set of parallel conceptual stop watches at different points in time depending on correspondence between at least one updated channel address and at least one corresponding valid channel address.

9. Method as claimed in claim 8, wherein said chronometer scheduling means includes a time indicator or pointer adapted to maintain a global notion of time, and that there is a one-to-one relation between a specific pointer value and a specific stop watch initiation.

10. Method as claimed in claim 1, characterized in that after the establishment of a new traffic analysis scheduling job an indicator or pointer will progress in a normal fashion, and after a repeated time interval said time indicator or pointer will again contain the same value as when the channel was first set for traffic analysis scheduling, at which point the traffic analysis job of said channel will be triggered.

11. Method as claimed in claim 1, characterized in that the process is repeated and scheduling/triggering occurs after each consecutive time interval, at every step (t) of advance of a time pointer an associated stop watch value being found and associated channel address field being inspected, and that if a valid channel address is found in said channel address field the associated channel which has been identified by said channel address will be scheduled/triggered for traffic analysis.

12. Method as claimed in claim 8, characterized in that the number of stop watches is greater than or equal to the number of possible channels and that the channel scheduler table with its channel address fields allows a channel to be set for traffic analysis scheduling at any point in time.

13. Method as claimed in claim 12, characterized in that when said channel address field which is identified by a current time pointer to-stop watch relation is already occupied by another channel, then insertion of the corresponding channel address will be halted until a time pointer indicates that a channel address field is available, meaning that the start of the associated time interval (t) must at most wait for a period of time corresponding to said time interval (t) times the number of possible channels (m)(m×t).

14. Method as claimed in claim 13, characterized in that during a lapse of a given time interval (t) said data accumulator means will have updated said channel data field of said channel address, said channel data being collected by said data accumulator means for said channel in question within the previous time interval which was used for triggering the associated traffic analysis job, and said data accumulator means resetting said channel data field of said channel address in order to prepare for the data accumulation of the next time interval.

15. A method for supporting traffic analysis in an ATM (Asynchronous Transfer Mode) network, in which a transmission procedure is based on asynchronous time division multiplexing using fixed-length data packets or cells, the method comprising:

using in combination a data accumulator means and a chronometer scheduling means for scheduling traffic channels to be analyzed, said data accumulator means comprising a channel data table which is continuously updated by traffic data to be analyzed, said chronometer scheduling means comprising a scheduler table which is continuously and sequentially selecting a next traffic analysis job to be executed, wherein scheduling of traffic analysis of a certain channel is effected when an updated channel address of said channel data table of said data accumulator means corresponds with a valid channel address in said scheduler table of said chronometer scheduling means; and the chronometer scheduling means selects the next traffic analysis job to be started, and actual triggering or dispatching of the execution of a selected traffic analysis job is realized by including an extra field in said channel data table, for each row thereof the entry of this field pointing to a code block that represents the analysis job to be performed for a specific channel.

16. Method as claimed in claim 15, characterized in that after the chronometer scheduling means has selected a specific channel address a computation environment will pass execution control to the specific code block pointed to within said field.

17. Method as claimed in claim 1, characterized in that the channel scheduler table in the chronometer scheduling means identifies stop watches and contains a coupling between said stop watches and channel addresses, and a time pointer of said chronometer scheduling means progressing down said channel scheduler table with a given frequency (1/t) and wrapping around a first entry of said table, after having pointed to a last entry.

18. Method as claimed in claim 1, characterized in that the chronometer scheduling means operates on a channel address field row by fetching a channel address of a current time pointer value, for thereafter scheduling a traffic analysis job for a channel.

19. Method as claimed in claim 1, characterized in that the traffic analysis job uses channel data contained within a channel data field of said channel address of said channel data table, and a number of stop watches and the frequency of advance (1/t) of a time pointer being configured to give a desired time interval.

20. Method as claimed in claim 1, characterized in that the channel data table and a channel address field are combined in one table containing two columns.

21. Method as claimed in claim 1, characterized in that said method is used on a link as a whole, on any desired group arrangement of connections within a link, or on individual connections on one or more links.

22. Method as claimed in claim 1, characterized in that scheduling of traffic analysis jobs is allowed at fixed and small time intervals which can have any predetermined value.

23. Method as claimed in claim 1, characterized in that said method is used to support a usage-based charging scheme in an ATM network.

24. A method for supporting traffic analysis in an ATM (Asynchronous Transfer Mode) network, in which a transmission procedure is based on asynchronous time division multiplexing using fixed-length data packets or cells, the method comprising:

using in combination a data accumulator and a scheduler, said data accumulator comprising a channel data table which is continuously updated by traffic data to be analyzed, and said scheduler comprising a scheduler table which is continuously and sequentially selecting next traffic analysis jobs to be executed, and wherein scheduling of traffic analysis of a certain channel of the ATM network is effected when an updated channel address of said channel data table of said data accumulator corresponds with a channel address in said scheduler table.

* * * * *